United States Patent
Soderquist et al.

(10) Patent No.: US 8,408,583 B2
(45) Date of Patent: Apr. 2, 2013

(54) FLANGELESS INFLATORS AND METHODS OF MAKING SUCH INFLATORS FOR USE WITH INFLATABLE AIRBAG CUSHIONS

(75) Inventors: Quin Soderquist, South Weber, UT (US); Bradley W. Smith, Plain City, UT (US)

(73) Assignee: Autoliv ASP, Inc., Ogden, UT (US)

( * ) Notice: Subject to any disclaimer, the term of this patent is extended or adjusted under 35 U.S.C. 154(b) by 72 days.

(21) Appl. No.: 12/942,623

(22) Filed: Nov. 9, 2010

(65) Prior Publication Data

US 2012/0112438 A1    May 10, 2012

(51) Int. Cl.
*B60R 21/16* (2006.01)
(52) U.S. Cl. .................. 280/728.2; 280/741
(58) Field of Classification Search ............ 280/728.2, 280/731, 736, 740; 102/530, 531
See application file for complete search history.

(56) References Cited

U.S. PATENT DOCUMENTS

| | | | |
|---|---|---|---|
| 3,958,949 A * | 5/1976 | Plantif et al. ................ 422/166 |
| 4,178,017 A * | 12/1979 | Ishi et al. .................... 280/740 |
| 5,257,815 A * | 11/1993 | Bachelder et al. ......... 280/728.2 |
| 5,277,442 A | 1/1994 | Cuevas |
| 5,423,568 A | 6/1995 | Zushi et al. |
| 5,470,097 A * | 11/1995 | Elqadah et al. ............ 280/728.3 |
| 5,501,487 A * | 3/1996 | Trevillyan et al. ............ 280/736 |
| 5,692,768 A * | 12/1997 | Mihm et al. ................ 280/728.2 |
| 5,931,491 A * | 8/1999 | Bosgeiter et al. .......... 280/728.2 |
| 6,056,319 A * | 5/2000 | Ruckdeschel et al. ........ 280/741 |
| 6,123,359 A * | 9/2000 | Cabrera et al. ................ 280/741 |
| 6,145,872 A | 11/2000 | Soderquist et al. |
| 6,189,915 B1 | 2/2001 | Soderquist et al. |
| 6,328,332 B1 * | 12/2001 | Schutz ....................... 280/728.2 |
| 6,490,978 B1 * | 12/2002 | Perotto et al. ................. 102/531 |
| 7,438,315 B2 * | 10/2008 | Blackburn .................... 280/741 |
| 7,699,368 B2 * | 4/2010 | Nicol .............................. 294/26 |
| 7,887,090 B2 * | 2/2011 | Trevillyan .................... 280/741 |
| 2002/0125705 A1 * | 9/2002 | Wong et al. ................ 280/743.2 |
| 2004/0046373 A1 * | 3/2004 | Wang et al. ................... 280/741 |
| 2005/0121894 A1 | 6/2005 | Brisighella et al. |
| 2005/0263994 A1 * | 12/2005 | Quioc .......................... 280/741 |
| 2009/0212545 A1 * | 8/2009 | Meissner et al. ............. 280/736 |

FOREIGN PATENT DOCUMENTS

DE    3833888    4/1990
DE    19905025    8/2000

* cited by examiner

*Primary Examiner* — Faye M Fleming
*Assistant Examiner* — Robert A Coker
(74) *Attorney, Agent, or Firm* — Madson IP, P.C.

(57) ABSTRACT

Flangeless inflators include a body comprising a base member and a diffuser member coupled together, where the body is devoid of a lateral inflator-coupling flange. At least one fastener is coupled to the base member of the body. In an inflatable airbag system, the flangeless inflator is coupled to an airbag cushion, as well as to a steering wheel armature. In forming flangeless inflators, a body is formed that is devoid of the lateral inflator-coupling flange, and at least one fastener is attached to the body.

17 Claims, 5 Drawing Sheets

FLANGELESS INFLATORS AND METHODS OF MAKING SUCH INFLATORS FOR USE WITH INFLATABLE AIRBAG CUSHIONS

TECHNICAL FIELD

The present disclosure relates generally to inflatable airbag cushions for motor vehicles. More specifically, various embodiments of the present disclosure relate to inflators adapted for use in inflatable airbag systems for motor vehicles.

BACKGROUND

Modern motor vehicles typically employ various occupant protection systems that self-actuate from an undeployed to a deployed state without the need for intervention by the occupant. Such systems often include an inflatable occupant protection system in the form of a cushion or bag, commonly referred to as an "airbag cushion," which is now a legal requirement for many new vehicles. Such airbag cushions are typically installed in various locations in a vehicle and may deploy into one or more locations within the vehicle between the occupant and certain parts of the vehicle interior, such as the doors, steering wheel, instrument panel, dashboard or the like, to prevent or cushion the occupant from forcibly striking such parts of the vehicle interior.

The airbag cushion is conventionally housed in an uninflated and folded condition to minimize space requirements. In the event of an accident, an accelerometer within the vehicle measures the abnormal deceleration and triggers the expulsion of rapidly expanding gases supplied or produced by a device commonly referred to as an "inflator." The expanding gases fill the airbags, which immediately inflate in front of the driver and/or passenger to provide protection from impact against a windshield, dashboard, or other surfaces of the vehicle interior.

Referring to FIG. 1, an example of a typical airbag cushion assembly 100 is shown. As illustrated, the inflator 102 is typically coupled with an airbag cushion 104 in such a manner as to enable the expanding gases to enter the airbag cushion 104 during deployment. In order to attach the inflator 102 to an armature 106 of a steering wheel 108, the inflator 102 conventionally includes a flange member 110. The flange member 110 of the inflator 102 typically includes about four (4) holes in the flange member 110 that attach to a studded retainer ring 112, as shown. Alternately, the flange member 110 includes about four (4) studs (not shown) for attaching the inflator 102 to an airbag module. The inflator, together with the retainer ring 112 and the airbag cushion 104 can then be attached to a housing 114, and the housing 114 can be coupled to the steering wheel armature 106. Often, the housing 114 includes a lid member 116 which can be secured about the housing 114 once the airbag cushion 104 is folded within the housing 114, or the lid member 116 can be integral with the housing 114.

The plurality of components used for conventional assemblies can require substantial space in a typically small area of, for example, the center portion of the steering wheel. Therefore, it may be desirable to provide assemblies that use fewer components and can reduce the space requirements of an airbag cushion assembly.

BRIEF SUMMARY

Various embodiments of the present disclosure comprise flangeless inflators for use with an airbag cushion. In one or more embodiments, an inflator may include a body comprising a base member and a diffuser member coupled together. The body is devoid of a lateral inflator coupling flange. At least one fastener may be coupled to the base member of the body. A quantity of gas generant and/or stored gas may be disposed within the body. Furthermore, an initiator may be coupled to the base member. The initiator may be disposed at least partially within the body to be in sufficient communication with the quantity of gas generant to initiate a reaction for producing a supply of inflation gas and/or for causing the release of stored gas during deployment.

Additional embodiments of the present disclosure comprise inflatable airbag systems. According to one or more embodiments, such systems may include an airbag cushion, which cushion includes an inflatable body with an opening for receiving a supply of inflation gas. A flangeless inflator may be positioned at least partially within the opening of the airbag cushion. The inflator includes a diffuser member coupled to a base member. Additionally, at least one fastener is coupled to the base member. The at least one fastener is coupled to an armature of a steering wheel.

Other embodiments of the present disclosure comprise methods of forming a flangeless inflator adapted for use with an inflatable airbag cushion system. One or more embodiments of such methods may include forming a body that is devoid of a lateral inflator coupling flange. At least one fastener is coupled to the body. A quantity of gas generant (and/or stored gas) is disposed within a portion of the body, and an initiator is positioned at least partially within the body, so as to be in sufficient communication with the quantity of gas generant to initiate a reaction for producing a supply of inflation gas during deployment.

BRIEF DESCRIPTION OF THE SEVERAL VIEWS OF THE DRAWINGS

Exemplary embodiments of the disclosure will become more fully apparent from the following description and appended claims, taken in conjunction with the accompanying drawings. Understanding that these drawings depict only exemplary embodiments and are, therefore, not to be considered limiting of the disclosure's scope, the exemplary embodiments of the disclosure will be described with additional specificity and detail through use of the accompanying drawings in which:

DETAILED DESCRIPTION

The illustrations presented herein are, in some instances, not actual views of any particular inflator or inflatable airbag system, but are merely idealized representations which are employed to describe the present disclosure. Additionally, elements common between figures may retain the same numerical reference designation.

Figure 2:
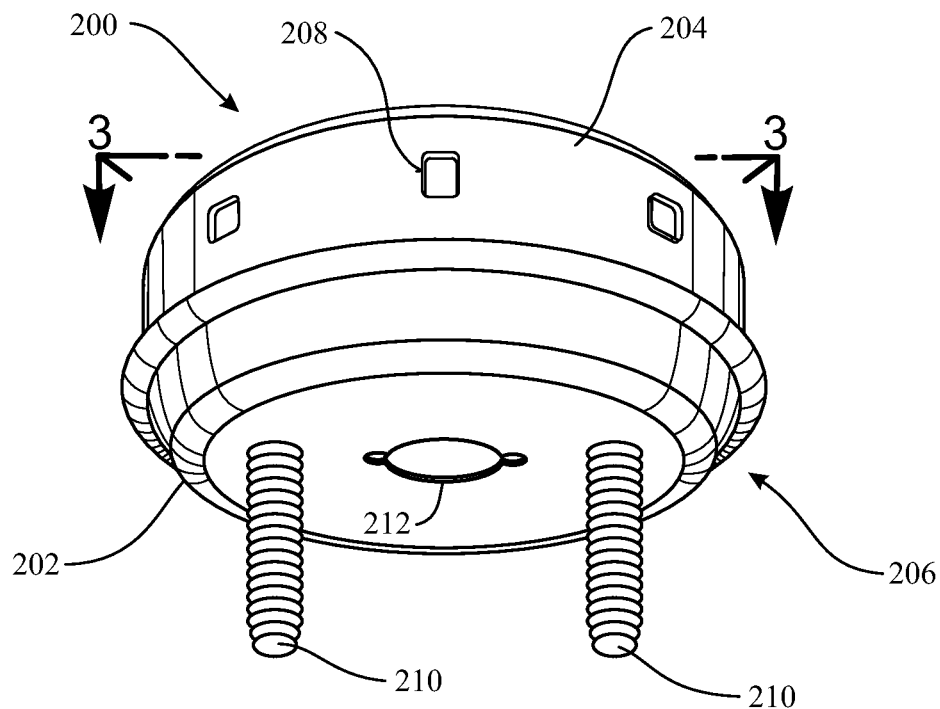
FIG. 2 is an isometric view of an inflator according to an example of at least one embodiment of the present disclosure.

Various embodiments of the present disclosure include flangeless airbag cushion inflators adapted for direct attachment to a steering wheel armature. FIG. 2 is an isometric view of an inflator 200 according to an example of at least one embodiment of the present disclosure. The inflator 200 is formed as a disk-shaped inflator and includes a base member 202 and a diffuser member 204. The base member 202 and the diffuser member 204 are coupled together in a conventional manner (e.g., by a weld, adhesive, mechanical means, etc.) to form a body 206.

The base member 202 can comprise a dish-shaped configuration with a lateral sidewall about its lateral diameter. The base member 202 may be configured to receive and be coupled with at least one initiator (e.g., initiator 304 in FIG. 3). That is, the base member 202 may include an aperture 212 adapted to receive and be coupled with one or more initiator assemblies that are common in the art.

The diffuser member 204 can also comprise a similar dish-shaped configuration with a lateral sidewall around its lateral diameter. The sidewall of the diffuser member 204 can include one or more apertures 208 through which an inflation gas can exit from the inflator 200 during deployment.

Figure 1:
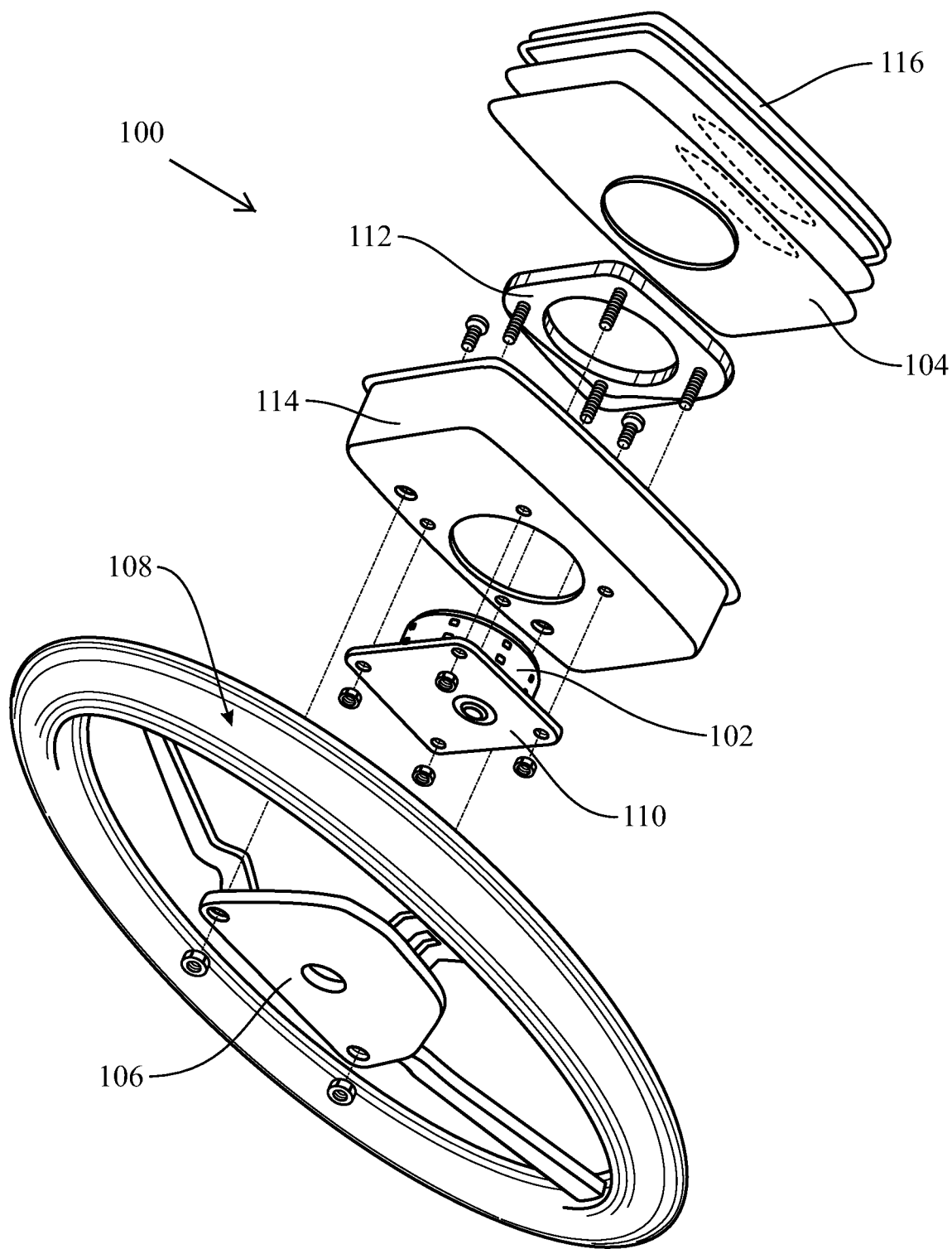
FIG. 1 is an isometric exploded view of an example of a conventional airbag cushion assembly.

According to a feature, neither the base member 202 nor the diffuser member 204 are formed with, or are coupled to a lateral inflator-coupling flange. As used herein, a lateral inflator-coupling flange refers to a protrusion that extends laterally from one or more portions of the lateral diameter of the body 206, and that is sized and configured to be capable of including attachment means for coupling the inflator to another component. An example of such a lateral inflator-coupling flange is the flange member 110 in FIG. 1 that is adapted to include one or more apertures for receiving a fastener (e.g., a mounting stud) or one or more fasteners coupled directly thereto. Thus, the inflator 200 is formed without such a flange member capable of including holes for receiving fasteners or including fasteners coupled thereto (referred to herein as flangeless).

To facilitate attachment of the inflator to another component, at least one fastener 210 is coupled directly to the base member 202. Although the fastener 210 shown in FIG. 2 is a mounting stud, the fastener 210 may comprise other fastening means, such as adhesive, clips, clamps, and the like. The at least one fastener 210 may be coupled to the base member 202 by any suitable means. For example, in some implementations the at least one fastener 210 may be bonded to the base member 202 using a weld, adhesive or other suitable materials and/or processes. In other implementations, the at least one fastener 210 may comprise a self-clinching fastener that is press fit through a respective hole in the base member 202.

With the one or more fasteners 210 coupled directly to the base member 202, the inflator 200 may be coupled directly to the armature of a steering wheel, as opposed to conventional implementations where the inflator is coupled to a housing, and the housing is then coupled to the armature of a steering wheel. In addition, fewer fasteners 210 may be employed than the four fasteners used in conventional inflators. For example, some embodiments of the inflator 200 may include only a single fastener 210 coupled to the base member 202. Other embodiments may include only two fasteners 210. In still other embodiment, the inflator 200 may include more than two fasteners 210 coupled to the base member 202.

Figure 3:
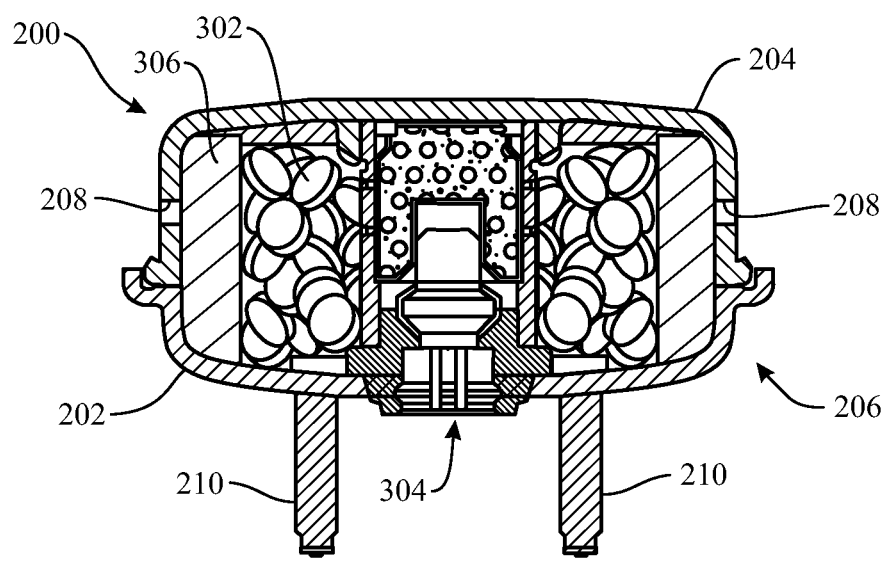
FIG. 3 is a cross-sectional view of the inflator of FIG. 2 according to at least one embodiment.

The body 206 of the inflator 200 may be sized and shaped to enclose or at least substantially enclose various components and features. Turning to FIG. 3, a cross-sectional view is shown according to at least one embodiment of the inflator 200 of FIG. 2. As shown, the inflator 200 may include a quantity of gas generant 302 disposed within the body 206. The gas generant 302 comprises a material adapted to generate (e.g., be converted into) a supply of inflation fluid during deployment of the inflator 200.

The body 206 further includes an initiator 304 coupled to the aperture 212 of the base member 202 (shown in FIG. 2). The initiator 304 is positioned so that it is in sufficient communication with the gas generant 302 to initiate a reaction of the quantity of gas generant 302 for producing the supply of inflation gas during deployment. The initiator 304 is generally adapted to initiate such a reaction of the quantity of gas generant 302 upon receipt of an electrical signal, such as may be generated by a sensor (not shown) upon the sensing of a collision.

Upon initiating the reaction of the gas generant 302, a supply of inflation gas is produced that flows outward from the body 206 through the apertures 208 in the diffuser 204. A filter 306 may be provided, which filter 306 is adapted to remove debris and heat from the inflation gas as the inflation gas is flowing to the apertures 208 of the diffuser 204. The filter 306 can accordingly be positioned within the body 206 of the inflator 200 between the quantity of gas generant 304 and the apertures 208 in the diffuser 204.

Although various components and/or features are described, it should be understood that fewer, additional and/or or alternate components and/or features may also be included within the body 206 of the inflator 200.

Figure 4:
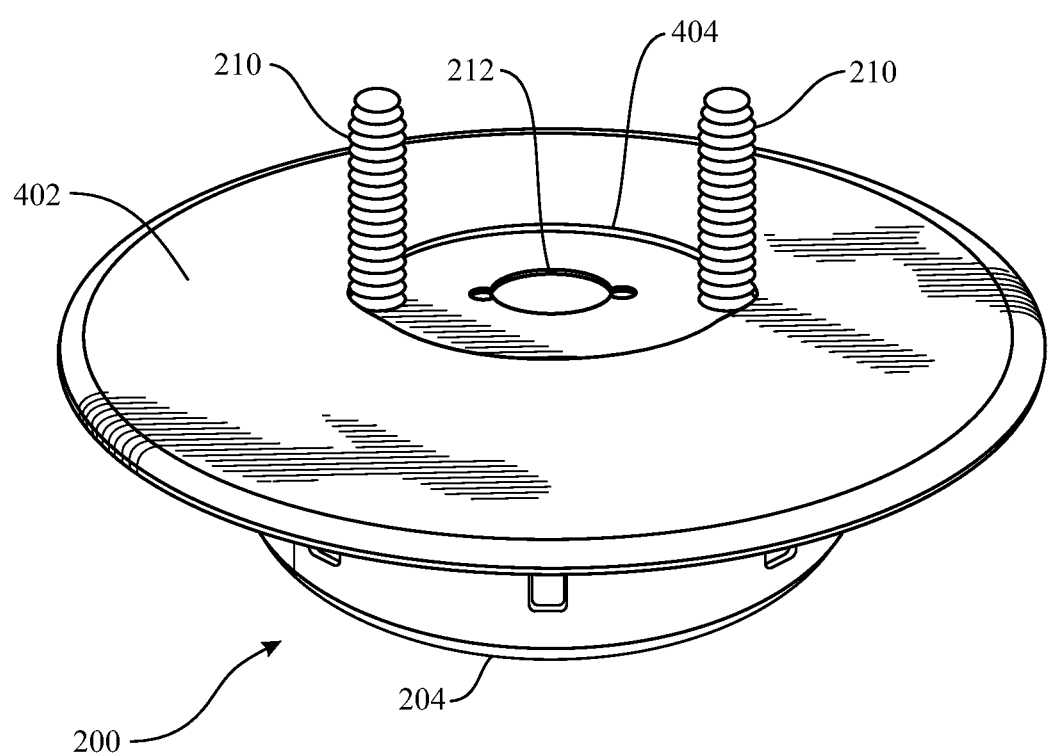
FIG. 4 is an isometric view of the inflator of FIG. 2 showing an addition of a washer positioned adjacent to the inflator.

In some implementations, the inflator 200 may include a washer 402 positioned adjacent to the base member 202, as shown in FIG. 4. The washer 402 may comprise a metallic plate that has one or more openings 404 through which the fasteners 210 may extend and through which electrical access may be provided to an initiator. The washer 402 may be adapted to aid in shielding heat produced by the inflator 200 during deployment from portions of an inflatable airbag cushion coupled to the inflator 200.

Figure 5:
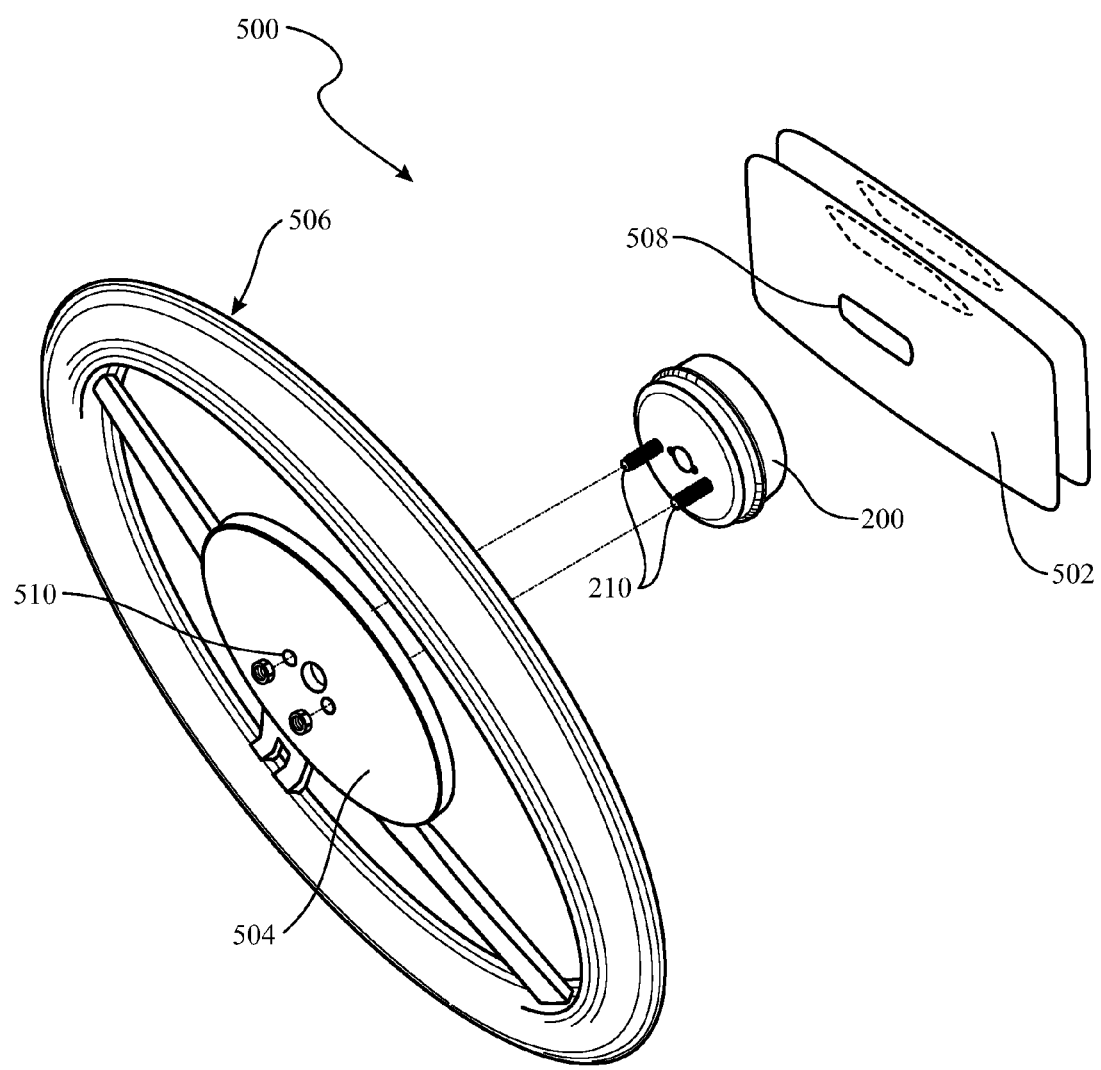
FIG. 5 is an exploded isometric view illustrating an inflatable airbag cushion system according to at least one embodiment.

Turning to FIG. 5, an exploded isometric view is shown, illustrating an inflatable airbag cushion system 500 according to at least one embodiment. The inflatable airbag cushion system 500 may include a flangeless inflator 200 that is coupled to an airbag cushion 502 and to an armature 504 of a steering wheel 506. The flangeless inflator 200 may comprise any embodiment of the inflator described above with reference to FIGS. 2-4, including a base member 202 and a diffuser member 204 coupled together, with at least one fastener 210 coupled to the base member 202 (see, e.g., FIG. 2).

The airbag cushion 502 may comprise any suitable conventional airbag cushion for use with a disk-shaped inflator 200. The inflator 200 may be positioned at least partially within an opening 508 of the airbag cushion 502. The opening 508 of the airbag cushion 502 may comprise a relatively small throat attach hole. By way of example, and not limitation, various embodiments of airbag cushions 502 suitable for use in the airbag cushion system 500 are described in U.S. Pat. No. 6,145,872 and U.S. Pat. No. 6,189,915, the disclosures of each being incorporated herein in their entirety by this reference.

The steering wheel 506 may comprise any conventional steering wheel having an armature 504 that is generally adapted to receive the inflator 200. That is, the steering wheel 506 and armature 504 can be of any conventional configuration, with the armature 504 including one or more apertures 510 adapted to receive the one or more fasteners 210 of the inflator 200. As noted above, the inflator 200 can be coupled directly to the armature 506 without a housing or other conventional module hardware. As a result, a relative increase in available space can be provided for folding the airbag cushion 502. For example, by eliminating the housing, the full amount of the wheel back shroud space can be utilized for folding the airbag cushion 502, as opposed to being constricted by the size of a particular housing.

Figure 6:
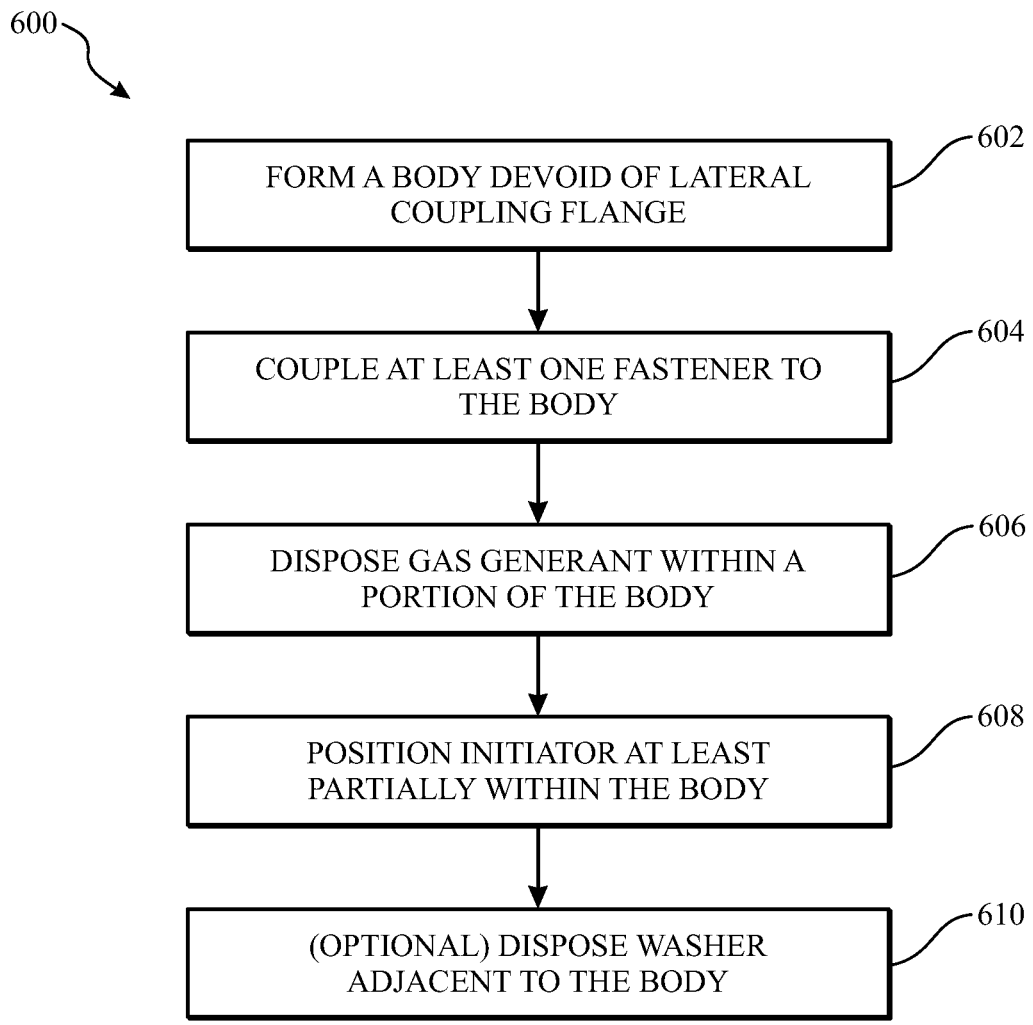
FIG. 6 is a flow diagram illustrating at least one embodiment of a method for forming an inflator.

Additional embodiments of the present disclosure relate to methods of forming flangeless inflators for use in inflatable airbag systems. FIG. 6 is a flow diagram illustrating at least one embodiment of a method for forming an inflator, such as an inflator 200 illustrated in FIGS. 2-4. With reference to FIG. 6, as well as to the elements of FIGS. 2-4, the method 600 includes formation of a body 206 that is devoid of a lateral coupling flange (i.e., flangeless) at step 602. For example, the body 206 may be formed by coupling a base member 202 to a diffuser member 204.

At least one fastener 210 can be coupled to the body 206 at step 604. For example, the at least one fastener 210 can be coupled to the base member 202. The one or more fasteners 210 can be coupled to the body 206 by bonding the at least one fastener 210 using, for example, a weld, an adhesive, or other suitable material and/or process. In other embodiments of the method 600, the at least one fastener 210 can be a self-clinching fastener that is press fit through a respective hole in the body 206. A single fastener 210 may be coupled to the body 206 in some implementations, while two (2) fasteners may be coupled to the body 206 in other implementations. In still other implementations, more than two (2) fasteners may be coupled to the body 206.

A quantity of gas generant 302 may be disposed within a portion of the body 206 at step 606. At step 608, an initiator 304 may also be positioned at least partially within the body so that it is in sufficient communication with the quantity of gas generant 302 to be capable of initiating a reaction for producing a supply of inflation gas during deployment. Furthermore, in at least some implementations, an optional washer 402 may be disposed adjacent to the body 206 at step 610.

It is noted, that although the forgoing method 600 is depicted as a flow diagram showing the various steps as a sequential process, many of the forgoing acts can be performed in another sequence, in parallel, or substantially concurrently. In addition, the order of the acts may be re-arranged.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

The invention claimed is:

1. A flangeless inflator capable of being coupled directly to a steering wheel armature, the inflator comprising:
   a body comprising a base member and a diffuser member coupled together, wherein the body is devoid of a lateral inflator-coupling flange;
   at least one fastener coupled to and extending outwardly from the base member of the body;
   a quantity of gas generant disposed within the body;
   an initiator coupled to the base member and disposed at least partially within the body to be in sufficient communication with the quantity of gas generant to initiate a reaction for producing a supply of inflation gas during deployment; and
   a single washer positioned adjacent to the base member and comprising at least one washer aperture through which each of the at least one fastener extends, a signal for actuating the initiator is receivable through the washer aperture.

2. The flangeless inflator of claim 1, wherein the at least one fastener is bonded to the base member.

3. The flangeless inflator of claim 1, wherein the at least one fastener comprises a self-clinching fastener disposed through a respective aperture in the base member.

4. The flangeless inflator of claim 1, wherein only one fastener is coupled to the base member of the body.

5. The flangeless inflator of claim 1, wherein two fasteners are coupled to the base member of the body.

6. An inflatable airbag system, comprising:
   an airbag cushion, the cushion including an inflatable body with an opening for receiving a supply of inflation gas;
   a flangeless inflator positioned at least partially within the opening of the airbag cushion, the inflator including a diffuser member coupled to a base member and at least one fastener coupled to and extending outwardly from the base member;
   a single washer positioned adjacent to the base member of the flangeless inflator, the washer comprising at least one washer aperture through which each of the at least one fastener extends, a signal for actuating an initiator is receivable through the washer aperture, the supply of inflation gas is produced by the initiator igniting gas generant housed within the flangeless inflator; and
   a steering wheel including an armature to which the at least one fastener of the inflator is coupled.

7. The inflatable airbag system of claim 6, wherein the washer is a heat-shielding washer.

8. The inflatable airbag system of claim 6, wherein the at least one fastener is bonded to the base member.

9. The inflatable airbag system of claim 6, wherein the at least one fastener comprises a self-clinching fastener disposed through a respective aperture in the base member.

10. The inflatable airbag system of claim 6, wherein only one fastener is coupled to the base member of the flangeless inflator.

11. The inflatable airbag system of claim 6, wherein two fasteners are coupled to the base member of the flangeless inflator.

12. A method of forming a flangeless inflator adapted for use with an inflatable airbag cushion system, the method comprising:
   forming a body that is devoid of a lateral inflator-coupling flange;
   coupling at least one fastener to the body so that the fastener extends outwardly from the body;
   disposing a quantity of gas generant within a portion of the body;
   positioning an initiator at least partially within the body to be in sufficient communication with the quantity of gas generant to initiate a reaction for producing a supply of inflation gas during deployment; and
   disposing a single washer adjacent to the body, wherein the washer comprises at least one opening through which each of the at least one fastener extends, the washer is a heat-shielding washer.

13. The method of claim 12, wherein forming the body comprises coupling a base member to a diffuser member.

14. The method of claim 12, wherein coupling the at least one fastener to the body comprises bonding the at least one fastener to the body.

15. The method of claim 12, wherein coupling the at least one fastener to the body comprises coupling a self-clinching fastener to the body.

16. The method of claim 12, wherein coupling the at least one fastener to the body comprises coupling only one fastener to the body.

17. The method of claim 12, wherein coupling the at least one fastener to the body comprises coupling two fasteners to the body.

* * * * *